METHODS OF AND APPARATUS FOR RECORDING UTILIZING ELASTIC MAGNETIC RECORDING TAPES
Filed April 6, 1962 2 Sheets-Sheet 1

INVENTOR.
CHESTER M. Mac CHESNEY
BY
Prangley, Baird, Clayton, Miller & Vogel,
ATTYS.

INVENTOR.
CHESTER M. MacCHESNEY
BY
Prangley, Baird, Clayton, Miller & Vogel,
ATTYS.

United States Patent Office 3,211,844

Patented Oct. 12, 1965

3,211,844

METHODS OF AND APPARATUS FOR RECORDING UTILIZING ELASTIC MAGNETIC RECORDING TAPES

Chester M. MacChesney, Chicago, Ill., assignor to Ellamac Incorporated, Chicago, Ill., a corporation of Illinois Filed Apr. 6, 1962, Ser. No. 185,546
18 Claims. (Cl. 179—100.2)

The present invention relates to magnetic recording and transcribing methods and apparatus, and particularly to such methods and apparatus employing elastic or stretchable magnetic recording tapes and magnetic record cards.

It is a general object of the present invention to provide improved magnetic recording and transcribing methods and apparatus employing elastic or stretchable magnetic recording tapes.

Another object of the invention is to provide improved magnetic recording and transcribing methods and apparatus, employing a magnetic recording tape having an elastomeric body carrying magnetizable material, the elastomeric body being capable of at least about 100% elongation and having substantially complete recoverability after 100% elongation thereof.

Another object of the invention is to provide an improved method of and apparatus for changing the time base of a signal by a factor of at least about two, utilizing a magnetic recording head and a magnetic pickup head in cooperation with an elastic or stretchable magnetic recording tape.

Another object of the invention is to provide an improved method of and apparatus for changing the space occupied by a signal upon a magnetic recording medium, whereby the space occupied by the output signal differs by a factor of at least about two from the space occupied by the input signal when recorded at the same fixed rate.

In connection with the foregoing object, it is another object of the invention to provide an improved method of and apparatus for changing the space occupied by a signal, wherein a plurality of recording and transcribing stages equal in number to the numeral "*n*" are provided in series, each stage being capable of changing the space occupied by the signal by a factor of at least about two, thereby to produce a final output signal occupying a space differing by a factor of at least about "$2^n$" from the space occupied by the first input signal when recorded at the same fixed rate.

Another object of the invention is to provide an improved method of and apparatus for reducing the time base of a signal by a factor of at least about two utilizing an elastic tape having an elastomeric body carrying magnetizable material and being capable of at least 100% elongation and having substantially complete recoverability after 100% elongation thereof, wherein the elastic recording tape is first held in at least a 100% elongated condition and moved at a fixed rate past a recording head while feeding an input signal thereto, and thereafter the elastic recording tape is held in the relaxed and fully recovered condition and moved at the same fixed rate past a pickup head to produce an output signal having a time base less than the time base of the input signal by a factor of about at least two.

In connection with the foregoing object, it is another object of the invention to provide an improved apparatus of the type set forth, wherein the elastic recording tape is fed along a first path of travel by a set of holdback rolls driven in a first fixed rate and a set of puller rolls driven at a second fixed rate which is 100% greater than the first fixed rate to stretch the recording tape therebetween and to move it past a recording head in at least a 100% elongated condition, and wherein the elastic recording tape is thereafter driven along a second path by a set of isolation rolls and a set of feed rolls both operated at the second fixed rate to move the elastic recording tape in the unstretched condition thereof past a pickup head to produce an output signal therefrom which when recorded at the second fixed rate occupies a space less than the space occupied by the input signal by a factor of at least about two.

A further object of the invention is to provide a method of and apparatus for increasing the time base of a signal by a factor of at least about two, wherein an elastic recording tape while held in the unstretched and fully recovered condition thereof is moved at a fixed rate past a recording head while feeding an input signal thereto, and where the elastic recording tape is thereafter moved while held in at least a 100% elongated condition at the same fixed rate past a pickup head, thereby to produce from the pickup head an output signal having a time base at least about twice the time base of the input signal.

In connection with the foregoing object, it is a further object of the invention to provide an apparatus of the type set forth, wherein the elastic recording tape is driven by feed rolls and isolation rolls at a fixed rate while held in the relaxed and fully recovered condition past a recording head while feeding the input signal thereto, and thereafter the elastic recording tape is driven by a set of holdback rolls at a second fixed rate that is at least less than one-half of the first fixed rate and a set of puller rolls driven at the first fixed rate to stretch the elastic recording tape therebetween and to move it past a pickup head at the first fixed rate to produce an output signal therefrom, whereby the time base of the output signal is increased by a factor of at least about two as compared to the time base of the input signal.

A still further object of the invention is to provide a method of and system for reducing the time base of an input signal to produce a storage signal, and storing the storage signal on the reduced time base, and thereafter recovering the stored signal and expanding the time base thereof to provide an output signal having substantially the same time base as the input signal.

Further features of the invention pertain to the particular arrangement of the steps of the method and of the elements of the apparatus, whereby the above-outlined and additional operating features thereof are attained.

The invention, both as to its organization and principles of operation, together with further objects and advantages thereof, will best be understood by reference to the following specification taken in connection with the accompanying drawings, in which:

FIGURES 1 and 2, taken together, comprise a diagrammatic illustration of the recording channel and the transcribing channel and the magnetic record card used therewith forming the magnetic recording and transcribing apparatus embodying the present invention, and in which the method of the present invention is carried out;

Figure 1:
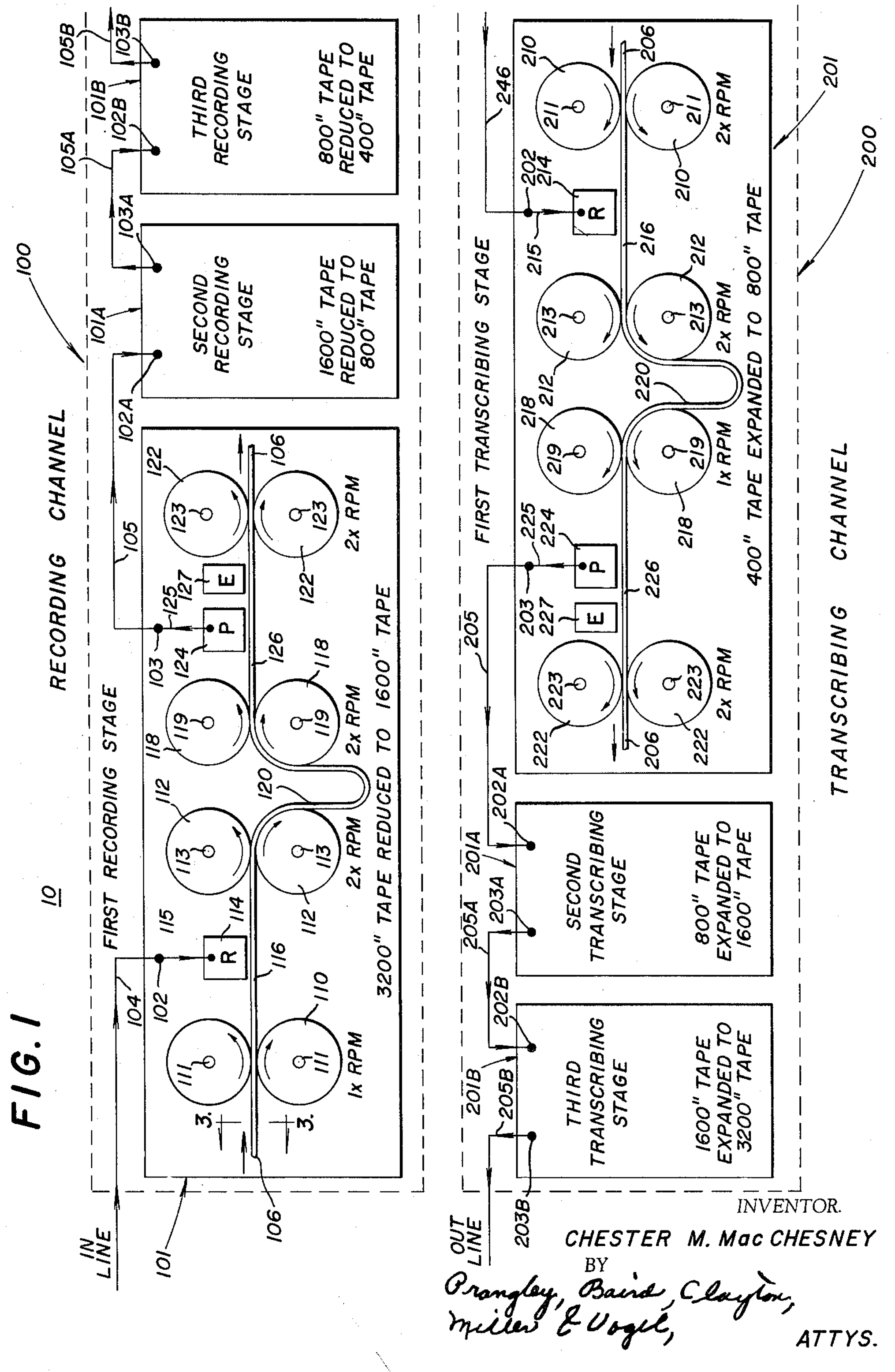
Figures 2, 3, 4:
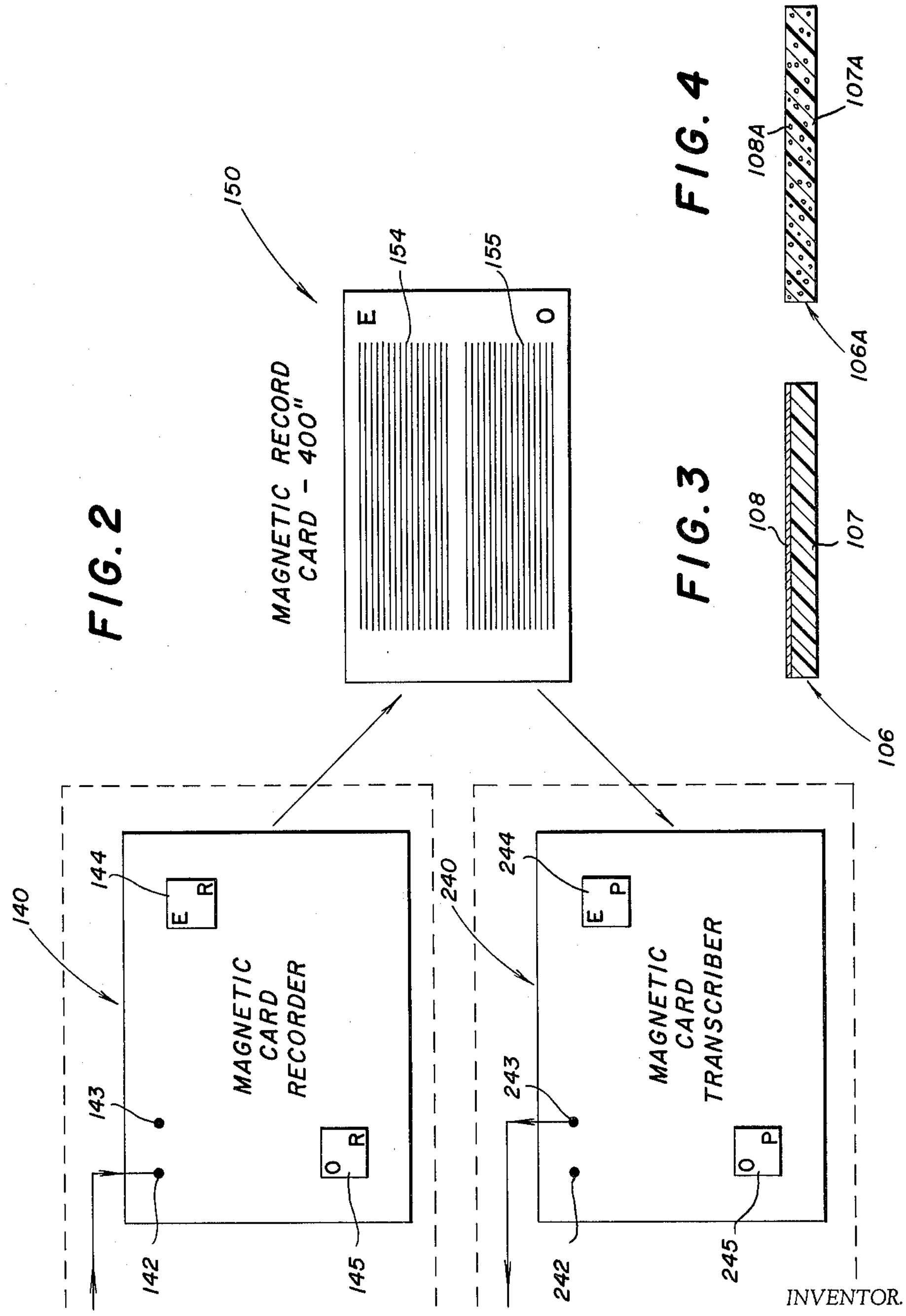
FIG. 3 is an enlarged sectional view through the stretchable magnetic recording tape, as viewed in the direction of the arrows along the line 3—3 of FIG. 1, and illustrating a first preferred embodiment thereof.
FIG. 4 is a view, similar to FIG. 3, and illustrating a second preferred embodiment of the magnetic recording tape forming a part of the present invention.

Referring now to FIGS. 1 and 2 of the drawings, there is illustrated a combination recording and transcribing apparatus, generally designated by the numeral 10, embodying the features of the present invention, and that is employed in carrying out the methods of the present invention; which apparatus 10 comprises generally a recording channel 100, a magnetic record card 150 and a transcribing channel 200.

More particularly, the recording channel 100 includes a plurality of recording stages connected in series and including a first recording stage 101, a second recording stage 101A, a third recording stage 101B and a magnetic card recorder 140. The first recording stage 101, as well as the second recording stage 101A and the third recording stage 101B, is particularly arranged and constructed to utilize therein the elastic magnetic recording tape described herein, the tape being generally designated by the numeral 106. As illustrated in FIG. 3, the tape 106 includes an elastomeric body 107 carrying on one surface thereof a layer 108 of magnetizable material, the material from which the body 107 is formed being capable of at least about 100% elongation as determined by the A.S.T.M. test method D638. One preferred material of construction for the body 107 is natural rubber compounded and processed to provide at least about 100% elongation and to provide substantially complete recoverability after 100% elongation thereof; it is to be understood that it is also possible to provide a body 107 of natural rubber which can provide substantially greater elongation with substantially complete recoverability, for example, up to 500% or more. Many of the synthetic organic plastic resins can also be compounded and molded in such a manner as to provide the elastomeric body 107 capable of at least about 100% elongation and having substantially complete recoverability, the synthetic organic resins including: nylon molding compounds, particularly Type 6; polyethylene resin including the medium density and low density compositions thereof; polypropylene resin; polychlorotrifluoroethylene resin; polytetrafluoroethylene resin; FEP fluorocarbon resin; the flexible vinyl chloride copolymers and flexible vinyl chloride-acetate copolymers; and vinylidene chloride resin. The magnetizable material 108 may be a magnetizable metal or a magnetizable oxide in the form of a plurality of discrete particles, the preferred material being paramagnetic iron oxide. The magnetizable material instead of being formed as a layer on one surface of the magnetic recording tape 106 may be uniformly distributed therethrough, such an embodiment of the invention being illustrated in FIG. 4, wherein the tape 106A is provided with an elastomeric body 107A which has the same composition as the elastomeric body 107 in FIG. 3, the body 107A having uniformly distributed therethrough a substantial number of particles 108A of the magnetizable material which may have the same composition as the material 108 in FIG. 3.

Referring specifically to FIG. 1, the first recording stage 101 is provided with an input terminal 102 and an output terminal 103, the input terminal 102 having connected thereto an input line 104 and the output terminal 103 having connected thereto an output line 105. The magnetic recording tape 106 is suitably operated upon within the first recording stage 101 first to record thereon while the tape 106 is in an elongated condition a signal from the input terminal 102 at a fixed rate, after which the signal recorded on the tape 106 is taken therefrom while the tape is moved in the relaxed and unstretched condition thereof at the same fixed rate past a pickup head to provide an output signal at the output terminal 103. More specifically, the tape 106 first contacts a set of holdback rolls 110 which direct the tape 106 along a first path to a set of puller rolls 112 and past a magnetic recording head 114. The holdback rolls 110 are continuously driven through a first drive mechanism including the shafts 111 fixedly connected thereto at a first continuous rate diagrammatically illustrated in the drawings as 1$x$ RPM, and the puller rolls 112 are continuously driven by a drive mechanism including the shafts 113 fixedly attached thereto at a second fixed rate diagrammatically represented in the drawings as 2$x$ RPM, the shafts 111 and 113 being preferably driven from a unitary first drive mechanism to provide proper coordination therebetween so that the section of the tape 106 disposed between the rolls 110 and 112, and designated by the numeral 116, is stretched 100% so that the effective length thereof is doubled and so that the tape section 116 passes the recording head 114 at a rate equal to the rate of drive of the puller rolls 112, namely, at a rate corresponding to 2$x$ RPM.

The magnetic recording head 114 is connected by a line 115 to the input terminal 102 and is therefore connected to the input line 104 to receive the input signal thereon, the head 114 recording the input signal on the stretched section 116 of the tape 106 while the section 116 is stretched 100% and while the section 116 is passing the recording head 114 at a first fixed rate corresponding to 2$x$ RPM rotation of the puller rolls 112. After leaving the puller rolls 112, the tape 106 is relaxed and returns to its unstretched and normal length and is put into a takeup loop 120 provided between the puller rolls 112 and a set of isolation rolls 118.

The isolation rolls 118 then feed the magnetic recording tape 106 in the unstretched or relaxed and fully recovered condition thereof along a second path to a set of feed rolls 122 and past a magnetic pickup head 124. As illustrated, the first recording stage 101 serves to decrease or reduce the time base of the input signal on the line 104 by a factor of two so that the output signal on the line 105 has a time base one-half that of the input signal on the line 104; to this end a second drive mechanism is provided for driving the rolls 118 and 122 intermittently at a speed equal to that of the puller rolls 112, namely, at a rate of 2$x$ RPM, the second drive mechanism including the shafts 118 fixedly connected to the rolls 118 and the shafts 123 fixedly connected to the rolls 122 and driven in synchronism with the shafts 119. It is necessary to drive the rolls 118 and 122 intermittently, and more particularly no more than 50% of the time of operation of the rolls 110 and 112, since the tape 106 is fed into the first recording stage 101, and particularly to the holdback rolls 110 thereof, at the rate of 1$x$ RPM which is one-half of the rate at which the tape 106, and particularly the unstretched portion 126 thereof between the rolls 118 and 122, is driven from the first recording stage 101.

The signal recorded on the tape 106 is detected by the pickup head 124 at the unstretched section 126 thereof and is conducted via a line 125 interconnecting the pickup head 124 and the output terminal 103 to the output line 105. The output signal appearing on the line 105 has a time base which is one-half that of the time base of the input signal appearing on the input line 104; or expressed in another way, the output signal on the line 105, if recorded at a fixed rate on a tape, would occupy one-half of the linear space that would be occupied by the input signal on the line 104 if the input signal were also recorded at the same fixed rate on a tape; for example, in accordance with the present invention, if the input signal on the input line 104 occupied 3,200 inches of tape, the output signal on the output line 105 would occupy a reduced space of only 1,600 inches of tape. In other words, the space occupied by the output signal from the first recording stage 101 has been reduced by the apparatus and method thereof in manipulating the stretchable magnetic recording tape 106 as it passes through the first recording stage 101, the output signal occupying a space which is reduced by a factor of two as compared to the space occupied by the input signal. It will further be seen that the factor of reduction may be different from two, which factor of two has been utilized as an illustration in describing the first recording stage 101; for example, the factor of reduction may be three, or even five, or even greater, provided that the magnetic recording tape 106 can accommodate the 300% or 500% elongation with substantially complete recoverability thereof, and further provided that the stretching of the tape section 116 and the relaxing of the tape section 126 are properly accomplished by the selection of appropriate rates of operation of the various sets of rolls 110, 112 and 118, 122. It further is desirable in many instances immediately to erase the tape section 126 after passing the pickup head 124 and to this end an erasing head 127 has also been provided.

It will be readily understood that a plurality of the recording stages 101 may be connected in series to provide for progressive reduction or compression of the time base of the input signal on the line 104, and the corresponding shortening of the space occupied by the signal upon a magnetic recording tape. There has been shown in FIG. 1 second and third recording stages in series with the recording stage 101, the second recording stage 101A having an input terminal 102A connected to the output line 105 from the first recording stage 101, and having an output terminal 103A to which is connected an output line 105A. The third recording stage 101B is provided with an input terminal 102B which is connected to the output line 105A from the second recording stage 101A, and also has an output terminal 103B connected to an output line 105B. Accordingly, the output on the line 105 from the first recording stage 101 provides the input to the second recording stage 101A; the output on the line 105A from the second recording stage 101A provides the input to the third recording stage 101B; and the output from the third recording stage 101B appears on the output line 105B and serves as the input to the magnetic card recorder, as will be explained more fully hereinafter. As illustrated in FIG. 1, the second recording stage 101A and the third recording stage 101B each also reduces the time base of the signal fed thereto by a factor of two, whereby to effect a corresponding reduction in the space occupied by the output signal on a magnetic tape by a factor of two; as a consequence, the input signal to the second recording stage 101A which occupies 1,600 inches of tape is compressed in the second recording stage 101A to occupy 800 inches of tape with a corresponding halving of the time base thereof, and the input signal to the third recording stage 101B which occupies 800 inches of tape is compressed in the third recording stage 101B to occupy 400 inches of tape with a corresponding halving of the time base thereof. Each of the three recording stages 101, 101A and 101B provides a two-fold compression or shortening of the time base and the space occupied by the signal on a tape, whereby the three stages in series provide an eight-fold reduction in the time base of the signal fed thereto with a corresponding eight-fold reduction from 3,200 inches to 400 inches of the space occupied by the input signal on a magnetic recording tape.

In accordance with the preferred embodiment of the present invention, the output signal from the third recording stage 101B, which would occupy 400 inches of tape when recorded at a certain fixed rate, is utilized as the input signal to the magnetic card recorder 140, which is preferably constructed in accordance with United States Letters Patent No. 2,846,516, issued August 5, 1958 to Chester M. MacChesney, for Magnetic Recording and Reproducing Apparatus. The recorder 140 is provided with an input terminal 142 and an output terminal 143, the input terminal 142 being connected by the line 105B to the output terminal 103B of the third recording stage 101B. Suitable circuitry is provided within the magnetic card recorder 140 alternately to apply the incoming signal from the input terminal 142 to a first magnetic recording head 144 and to a second magnetic recording head 145 while the recording heads 144 and 145 are driven at the above-mentioned certain fixed rate for the purpose of recording the signal upon the magnetic record card 150, which is also described and illustrated in detail in the United States Patent No. 2,846,516 referred to above. In a typical example of the magnetic record card 150, the longer dimension thereof is 11 inches long and the shorter dimension thereof is 8½ inches long, a plurality of strips or lines 154 and 155 of magnetizable material being carried thereby and oriented in the direction of the longer dimension of the card 150, there being 20 lines 154 thereon and there being 20 lines 155 thereon, each of the lines being ⅛ inch wide and spaced 1/16 inch from the adjacent line, a 5/16 inch space being provided between the upper group of lines 154 and the lower group of lines 155, there being 40 lines in all each 10 inches long to provide a total length of magnetizable material of 400 inches upon the card 150. The lines 154 are particularly adapted to cooperate with the recording head 144 and the lines 155 are likewise particularly adapted to cooperate with the recording head 145, the magnetic card recorder 140 being constructed in a manner such that the incoming signal at the input terminal 142 is first connected to the recording head 145, which is referred to as the "odd" recording head, the recording head 145 initially being in alignment with the lowermost line 155, the lines 155 being designated as the "odd" lines. The recording head 145 proceeds along the lowermost line 155 and records thereon the first ten inches of signal at the input terminal 142, after which the input signal is switched to the recording head 144, designated as the "even" recording head, which is in alignment with the lowermost one of the lines 154, designated the "even" lines. The recording head 144 then proceeds to record the next 10 inches of the incoming signal on the lowermost line 154, after which the input signal is switched from the recording head 144 back to the recording head 145 which is now in registry with the second from the bottom line 155 and at the end thereof adjacent to the end of the lowermost line 155 which was last recorded upon. At the completion of the second line 155, the incoming signal from the input terminal 142 is switched from the recording head 145 back to the recording head 144 which has now been shifted upwardly into alignment with the line 154 second from the bottom and the next 10 inches of incoming signal are recorded thereon. This recording operation is continued with the incoming signal at the input terminal 142 being alternately switched from the recording head 144 to the recording head 145 and back again, and with the recording heads 144 and 145 first being driven in one direction along the associated line while the signal was fed thereto, and then after operation of the other recording head, being moved in the other direction along the adjacent line while recording thereon. In all, 400 inches of the incoming signal at the input terminal 142 can be recorded upon the card 150, whereby the 3,200 inches of input signal to the first recording stage 101 of the recording channel 100 has been reduced to 400 inches of signal for recording upon the record card 150. The record card 150 can be stored substantially indefinitely with the reduced time base signal thereon.

When it is desired to retrieve the information stored upon the magnetic record card 150, it is inserted as the input to the transcribing channel 200, and more specifically it is inserted as the input to a magnetic card transcriber 240, the transcriber 240 including an input terminal 242, an output terminal 243, an "even" magnetic pickup head 244 and an "odd" magnetic pickup head 245. Suitable circuitry within the magnetic transcriber 240, when actuated, causes the pickup heads 244 and 245 alternately to traverse in opposite directions the lines 154 and 155 on the magnetic record card 150 and to produce at the output terminal 243 a continuous output signal which faithfully reproduces the input signal fed to the input terminal 142 of the magnetic card recorder 140. Accordingly, there is produced at the output terminal 243 a suitable signal applied to a line 246 connected thereto which is fed as an input to the first transcribing stage 201. It will be understood that the magnetic card recorder 140 and the magnetic card transcriber 240 may be the same machine or identical machines provided with suitable circuitry to cause either recording or transcribing as required, further details of a machine particularly suited for use in the present invention being found in the United States Letters Patent No. 2,846,516 referred to above.

The transcribing channel 200 in addition to the magnetic card transcriber 240 includes a plurality of transcribing stages connected in series and including a first transcribing stage 201, a second transcribing stage 201A and a third transcribing stage 201B. The first transcribing stage 201, as well as the second transcribing stage 201A and the third transcribing stage 201B, is particularly arranged and constructed to utilize therein a stretchable magnetic recording tape of the type forming a part of the present invention, the magnetic recording tape used in transcribing being generally designated by the numeral 206. The first transcribing stage 201 is provided with an input terminal 202 and an output terminal 203, the input terminal 202 having connected thereto the line 246 which is also connected to the output terminal 243 of the magnetic card transcriber 240, and the output terminal 203 having connected thereto an output line 205. The magnetic recording tape 206 is suitably operated upon within the first transcribing stage 201 to first record thereon while the tape 206 is in the fully relaxed and unstretched condition a signal from the input terminal 202 at a fixed rate, after which the signal recorded on the tape 206 is taken therefrom while the tape is moved in an elongated condition thereof at the same fixed rate past a pickup head to provide an output signal at the output terminal 203. More specifically, the tape 206 first contacts a set of feed rolls 210 which direct the tape 206 along a first path to a set of isolation rolls 212 and past a magnetic recording head 214. The feed rolls 210 and the isolation rolls 212 are driven through a first drive mechanism including the shafts 211 and 213, respectively, fixedly connected thereto at a first constant rate diagrammatically illustrated in the drawings as 2$x$ RPM, the section of the tape 206 between the rolls 210 and 212 being designated by the numeral 216 and being in the relaxed and unstretched condition thereof so that the tape section 216 passes the recording head 214 at a rate equal to the rate of drive of the rolls 210 and 212, namely, at a rate corresponding to 2$x$ RPM.

The magnetic recording head 214 is connected by a line 215 to the input terminal 202 and is therefore connected to the line 246 to receive the signal detected from the magnetic record card 150 by the magnetic card transcriber 240, the head 214 recording the input signal on the unstretched section 216 of the tape 206 while the section 216 is in the relaxed and fully recovered condition thereof and is passing the recording head 214 at a first fixed and constant rate corresponding to 2$x$ RPM rotation of the rolls 210 and 212. After leaving the isolation rolls 212, the tape 206 is still relaxed and is put into a takeup loop 220 provided after the isolation rolls 212.

The tape 206 from the takeup loop 220 is fed to a set of holdback rolls 218 which feed the magnetic recording tape 206 along a second path to a set of puller rolls 222 and past a magnetic pickup head 224. As illustrated, the first transcribing stage 201 serves to increase or expand the time base of the input signal at the input terminal 202 by a factor of two so that the output signal at the output terminal 203 has a time base twice that of the input signal at the input terminal 202; to this end a second drive mechanism is provided for driving the rolls 218 and 222, the rolls 218 being driven by the second drive mechanism including the shafts 213 fixedly attached thereto at a constant rate 1$x$ RPM, and the rolls 222 being driven by the second drive mechanism including the shafts 223 fixedly attached thereto at a constant rate of 2$x$ RPM, whereby the section of the tape 206 disposed between the rolls 218 and 222, and designated by the numeral 226, is stretched 100% so that the effective length thereof is doubled and so that the tape section 226 passes the pickup head 224 at a rate equal to the rate of drive of the puller rolls 222, namely, at a rate corresponding to 2$x$ RPM and a rate equal to the rate at which the tape section 216 passes the magnetic recording head 214.

The signal recorded on the tape 206 along the unstretched portion 216 thereof is detected by the pickup head 224 at the stretched section 226 and is conducted via a line 225 interconnecting the pickup head 224 and the output terminal 203 to an output line 205. The output signal appearing on the line 205 has a time base which is twice that of the input signal appearing at the input terminal 202; or expressed in another way, the output signal at the output terminal 203, if recorded at a fixed rate on a tape, would occupy twice the linear space that would be occupied by the input signal at the input terminal 202 if the input signal were also recorded at the same fixed rate on a tape; for example, in accordance with the present invention, the input signal at the input terminal 202 corresponds to 400 inches of tape, and the output signal at the output terminal 203 occupies an expanded space of 800 inches of tape. In other words, the space occupied by the output signal from the first transcribing stage 201 has been increased by the apparatus and method thereof in manipulating the stretchable magnetic recording tape 206 and as it passes through the first transcribing stage 201, the output signal occupying the space that is increased by a factor of two as compared to the space occupied by the input signal. It will further be seen that the factor of expansion may be different from two, which factor of two has been utilized as an illustration in describing the first transcribing stage 201; for example, the factor of expansion may be three, or even five, or even greater, provided that the magnetic recording tape 206 can accommodate the 300% or 500% elongation with substantially complete recoverability thereof, and further providing that the stretching of the tape section 226 with respect to the unstretched tape section 216 is properly accomplished by the selection of appropriate rates of operation of the various sets of rolls 210, 212 and 218, 222.

It further will be understood that it may be necessary to operate the rolls 210 and 212 intermittently, and more particularly no more than 50% of the time of operation of the rolls 218 and 222, since the tape 206 is fed into the first transcribing stage 201, and particularly to the feed rolls 210 thereof, at the rate of 2$x$ RPM which is twice the rate at which the tape 206 is driven from the first transcribing stage 201, and particularly from the puller rolls 222 thereof, the rate at which the tape 206 leaves the rolls 222 corresponding to the rate of drive of the holdback rolls 218 which is 1$x$ RPM or one-half of the rate at which the tape 206 is fed to the feed rolls 210. It further is desirable in many instances immediately to erase the tape section 226 after passing the pickup head 224 and to this end an erasing head 227 has also been provided.

It will be readily understood that a plurality of the transcribing stages 201 may be connected in series to provide for a progressive increase or expansion of the time base of the input signal at the input terminal 202, and consequently to provide for the corresponding increase or expansion of the space occupied by the signal upon a magnetic recording tape. There has been shown in FIG. 1 second and third transcribing stages in series with the transcribing stage 201, the second transcribing stage 201A having an input terminal 202A connected to the output line 205 from the first transcribing stage 201, and having an output terminal 203A connected to an output line 205A. The third transcribing stage 201B has an input terminal 202B connected to the output line 205A from the second transcribing stage 201A and has an output terminal 203B to which is connected an output line 205B. Accordingly, the output on the line 205 from the first transcribing stage 201 provides the input to the second transcribing stage 201A; the output on the line 205A from the second transcribing stage 201A provides the input to the third transcribing stage 201B; and the output on the line 205B of the third transcribing stage 201B serves as the output from the transcribing channel 200. As illustrated in FIG. 1, the second transcribing stage 201A and the third transcribing stage 201B each also increases the time base of the signal fed thereto by a factor of two, whereby to effect a corresponding expansion in the space occupied by the output signal on a magnetic tape by a factor of two; as a consequence, the input signal to the second transcribing stage 201A which occupies 800 inches of tape is increased in the second transcribing stage 201A to occupy 1,600 inches of tape with a corresponding doubling of the time base thereof; the input signal to the third transcribing stage 201B which occupies 1,600 inches of tape is expanded in the third transcribing stage 201B to occupy 3,200 inches of tape with a corresponding doubling of the time base thereof. Each of the transcribing stages 201, 201A and 201B provides a two-fold expansion or lengthening of the time base and the space occupied by the signal on a tape, whereby the three stages in series provide an eight-fold expansion or lengthening of the time base of the signal fed thereto with a corresponding eight-fold expansion from 400 inches to 3,200 inches of the space occupied by the input signal on a magnetic recording tape.

From the above it will be seen that the combination recording and transcribing apparatus 10 embodying the present invention is useful in reducing the time base of a signal for storing the signal on the reduced time base in a convenient form such as on the magnetic record card 150 which occupies only a fraction of the space that would be occupied by a magnetizable medium such as a magnetic tape carrying the input signal in its full time base form. The compression or shortening of the time base of the input signal is readily accomplished utilizing the elastic magnetic tape described and employing a series of the recording stages 101. When desired, the information stored on the magnetic record card 150 in a reduced and shortened form can be readily detected by the magnetic transcriber 240 and the time base of the stored signal expanded or lengthened to the original value of the input signal.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of changing the time base of a signal by a factor of at least about two, comprising providing a magnetic recording head and a magnetic pickup head and a magnetic recording medium having an elastomeric body carrying magnetizable material and being capable of at least 100% elongation and having substantially complete recoverability after 100% elongation thereof, moving said magnetic recording medium while held in a first dimensional condition thereof at a fixed rate past said recording head while feeding an input signal thereto, and thereafter moving said magnetic recording medium while held in a second dimensional condition that differs from said first dimensional condition by a factor of at least about two at said fixed rate past said pickup head, thereby to produce from said pickup head an output signal having a time base differing from the time base of said input signal by a factor of at least about two.

2. The method of changing the space occupied by a signal upon a magnetic recording medium by a factor of at least about two, comprising providing a magnetic recording head and a magnetic pickup head and a magnetic recording tape having an elastomeric body carrying magnetizable material and being capable of at least 100% elongation and having substatnially complete recoverability after 100% elongation thereof, moving said magnetic recording tape while held in a first dimensional condition thereof at a fixed rate past said recording head while feeding an input signal thereto, thereafter moving said magnetic recording tape while held in a second dimensional condition that differs from said first dimensional condition by a factor of at least about two at said fixed rate past said pickup head to produce an output signal therefrom, and recording said output signal on a magnetic record card at said fixed rate, whereby the space occupied by the output signal on said magnetic record card differs by a factor of at least about two from the space occupied by the input signal when recorded at said fixed rate.

3. The method of changing the space occupied by a signal set forth in claim 2, wherein the steps of moving the magnetic recording tape past said recording head and said pickup head are repeated "*n*" number of time utilizing the output signal from the preceding pickup head as the input signal to the next recording head, thereby to produce on said magnetic record card a final output signal occupying a space differing by a factor of at least about "$2^n$" from the space occupied by the first input signal when recorded at said fixed rate.

4. The method of reducing the time base of a signal by a factor of at least about two, comprising providing a magnetic recording head and a magnetic pickup head and a magnetic recording tape having an elastomeric body carrying a magnetizable material and being capable of at least 100% elongation and having substantially complete recoverability after 100% elongation thereof, moving said magnetic recording tape while held in at least a 100% elongated condition at a fixed rate past said recording head while feeding an input signal thereto, and thereafter moving said magnetic recording tape while held in the relaxed and fully recovered condition at said fixed rate past said pickup head, thereby to produce from said pickup head an output signal having a time base less than the time base of said input signal by a factor of at least about two.

5. The method of reducing the space occupied by a signal upon a magnetic recording medium by a factor of at least about two, comprising providing a magnetic recording head and a magnetic pickup head and a magnetic recording tape having an elastomeric body carrying magnetizable material and being capable of at least 100% elongation and having substantially complete recoverability after 100% elongation thereof, moving said magnetic recording tape while held in at least a 100% elongated condition at a fixed rate past said recording head while feeding an input signal thereto, thereafter moving said magnetic recording tape while held in the relaxed and fully recovered condition at said fixed rate past said pickup head to produce an output signal therefrom, and recording said output signal on a magnetic record card at said fixed rate, whereby the space occupied by the output signal on said magnetic record card is less than the space occupied by the input signal by a factor of at least about two when recorded at said fixed rate.

6. The method of reducing the space occupied by a signal set forth in claim 5, wherein the steps of moving the magnetic recording tape past said recording head and said pickup head are repeated "*n*" number of times utilizing the output signal from the preceding pickup head as the input signal to the next recording head, thereby to produce on said magnetic record card a final output signal occupying a space smaller than the space occupied by the first input signal by a factor of at least about "$2^n$" when recorded at said fixed rate.

7. The method of increasing the time base of a signal by a factor of at least about two, comprising providing a magnetic recording head and a magnetic pickup head and a magnetic recording tape having an elastomeric body carrying magnetizable material and being capable of at least 100% elongation and having substantially complete recoverability after 100% elongation thereof, moving said magnetic recording tape while held in the unstretched and fully recovered condition thereof at a fixed rate past said recording head while feeding an input signal thereto, and thereafter moving said magnetic recording tape while held in at least a 100% elongated condition at said fixed rate past said pickup head, thereby to produce from said pickup head an output signal having a time base at least about twice the time base of said input signal.

8. The method of increasing the time base of a signal set forth in claim 1, wherein the steps of moving the magnetic recording tape past said recording head and said pickup head are repeated "$n$" number of times utilizing the output signal from the preceding pickup head as the input signal to the next recording head, thereby to produce a final output signal having a time base at least about "$2^n$" times the time base of the first input signal.

9. Apparatus for changing the time base of a signal by a factor of at least about two, comprising a magnetic recording medium having an elastomeric body carrying magnetizable material and being capable of at least 100% elongation and having substantially complete recoverability after 100% elongation thereof, a magnetic recording head mounted adjacent to a first path of travel for said magnetic recording medium, first drive mechanism for moving said magnetic recording medium along said first path while held in a first dimensional condition thereof at a fixed rate past said recording head while an input signal is fed thereto, a magnetic pickup head mounted adjacent to a second path of travel for said magnetic recording medium, and second drive mechanism for moving said magnetic recording medium along said second path while held in a second dimensional condition that differs from said first dimensional condition by a factor of at least about two at said fixed rate past said pickup head, thereby to produce from said pickup head an output signal having a time base differing from the time base of said input signal by a factor of at least about two.

10. Apparatus for changing the space occupied by a signal upon a magnetic recording medium by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, first drive mechanism for moving said magnetic recording tape along said first path while held in a first dimensional condition thereof at a fixed rate past said recording head while an input signal is fed thereto, a magnetic pickup head mounted adjacent to a second path of travel for said magnetic recording tape, second drive mechanism for moving said magnetic recording tape along said second path while held in a second dimensional condition that differs from said first dimensional condition by a factor of at least about two at said fixed rate past said pickup head to produce an output signal therefrom, and a magnetic card recorder for receiving said output signal and for recording it on a magnetic record card at said fixed rate, whereby the space occupied by the output signal on said magnetic record card differs by a factor of at least about two from the space occupied by the input signal when recorded at said fixed rate.

11. Apparatus for reducing the space occupied by a signal upon a magnetic recording medium by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, first drive mechanism for moving said magnetic recording tape along said first path while held in at least a 100% elongated condition at a fixed rate past said recording head while an input signal is fed thereto, a magnetic pickup head mounted adjacent to a second path of travel for said magnetic recording tape, and second drive mechanism for moving said magnetic recording tape along said second path while held in the relaxed and fully recovered condition at said fixed rate past said pickup head, thereby to produce from said pickup head an output signal having a time base less than the time base of said input signal by a factor of at least about two.

12. Apparatus for reducing the space occupied by a signal upon a magnetic recording medium by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, first drive mechanism for moving said magnetic recording tape along said first path while held in at least a 100% elongated condition at a fixed rate past said recording head while an input signal is fed thereto, a magnetic pickup head mounted adjacent to a second path of travel for said magnetic recording tape, second drive mechanism for moving said magnetic recording tape along said second path while held in the relaxed and fully recovered condition thereof at said fixed rate past said pickup head to produce an output signal therefrom, and a magnetic card recorder for receiving said output signal and for recording it on a magnetic record card at said fixed rate, whereby the space occupied by the output signal on said magnetic record card differs by a factor of at least about two from the space occupied by the input signal when recorded at said fixed rate.

13. Apparatus for reducing the space occupied by a signal upon a magnetic recording medium by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, a set of holdback rolls engaging said magnetic recording tape at the inlet to said first path and a set of puller rolls engaging said magnetic recording tape at the oulet of said first path, first drive mechanism for driving said holdback rolls at a first fixed rate and for driving said puller rolls at a second fixed rate which is at least 100% greater than said first fixed rate to stretch said magnetic recording tape therebetween and to move it along said first path in at least a 100% elongated condition, whereby said holdback rolls and said puller rolls and said first drive mechanism move said magnetic recording tape along said first path while held in a least a 100% elongated condition at said second fixed rate past said recording head while an input signal is fed thereto, a magnetic pickup head mounted adjacent to a second path of travel for said magnetic recording tape, a set of isolation rolls engaging said magnetic recording tape at the inlet to said second path and a set of feed rolls engaging said magnetic recording tape at the outlet of said second path, second drive mechanism for driving said isolation rolls and said feed rolls together and at said second fixed rate, whereby said isolation rolls and said feed rolls and said second drive mechanism move said magnetic recording tape along said second path while held in the relaxed and fully recovered condition at said second fixed rate past said pickup head to produce an output signal therefrom, and a magnetic card recorder for receiving said output signal and for recording it on a magnetic record card at said second fixed rate, whereby the space occupied by the output signal on said magnetic record card is less than the space occupied by the input signal by a factor of at least about two when recorded at said second fixed rate.

14. Apparatus for reducing the space occupied by a signal upon a magnetic recording medium, comprising "$n$" number of magnetic recording stages each including an input terminal and an output terminal, and a magnetic card recorder connected to the output of the final magnetic recording stage for recording the output thereof on a magnetic record card; each magnetic recording stage including a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape and connected to the input terminal of said magnetic recording stage, first drive mechanism for moving said magnetic recording tape along said first path while held in at least a 100% elongated condition at a fixed rate past said recording head, a magnetic pickup head mounted adjacent to a second path of travel for said magnetic recording tape and having the output thereof connected to the output terminal of said magnetic recording stage, second drive mechanism for moving said magnetic recording tape along said second path while held in the relaxed and fully recovered condition thereof at said fixed rate past said pickup head to produce an output signal therefrom, the output terminal of the first and each intermediate magetic recording stage being connected to the input terminal of the succeeding magnetic recording stage and the output terminal of the final magnetic recording stage being connected to the input terminal of said magnetic card recorder whereby to produce on a magnetic record card a final output signal occupying a space reduced by a factor of at least about "$2^n$" compared to the space occupied by the first input signal when recorded at said fixed rate.

15. Apparatus for increasing the time base of a signal by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, first drive mechanism for moving said magnetic recording tape along said first path while held in the unstretched and fully recovered condition thereof at a fixed rate past said recording head while an input signal is fed thereto, a magnetic pickup head mounted adjacent to a second path of travel for said magnetic recording tape, and second drive mechanism for moving said magnetic recording tape along said second path while held in at least a 100% elongated condition at said fixed rate past said pickup head to produce an output signal therefrom, whereby the time base of said output signal is increased by a factor of at least about two as compared to the time base of said input signal.

16. Apparatus for increasing the time base of a signal by a factor of at least about two, comprising a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape, a set of feed rolls engaging said magnetic recording tape at the inlet to said first path and a set of isolation rolls engaging said magnetic recording tape at the outlet of said first path, first drive mechanism for driving said feed rolls and said isolation rolls together and at a first fixed rate, whereby said feed rolls and said isolation rolls and said first drive mechanism move said magnetic recording tape along said first path while held in the relaxed and fully recovered condition at said first fixed rate past said recording head while an input signal is fed thereto, a magnetic pickup head mounted adjacent to a second path of travel for said magnetic recording tape, a set of holdback rolls engaging said magnetic tape at the input to said second path and a set of puller rolls engaging said magnetic tape at the outlet of said second path, and second drive mechanism for driving said holdback rolls at a second fixed rate which is at least less than one-half of said first fixed rate and for driving said puller rolls at said first fixed rate to stretch said magnetic recording tape therebetween and to move it along said second path in at least a 100% elongated condition, whereby said holdback rolls and said puller rolls and said second drive mechanism move said magnetic recording tape along said second path while held in at least a 100% elongated condition at said first fixed rate past said pickup head to produce an output signal therefrom, whereby the time base of said output signal is increased by a factor of at least about two as compared to the time base of said input signal.

17. Apparatus for increasing the time base of a signal, comprising a magnetic card transcriber having as an input thereto a signal from a magnetic record card and having as an output therefrom a signal appearing on an output terminal thereof, and an "$n$" number of magnetic transcribing stages each including an input terminal and an output terminal; each magnetic transcribing stage including a magnetic recording tape having an elastomeric body carrying magnetizable material and being capable of at least 100% elongation and having substantially complete recoverability after 100% elongation thereof, a magnetic recording head mounted adjacent to a first path of travel for said magnetic recording tape and connected to the input terminal of said magnetic transcribing stage, first drive mechanism for moving said magnetic recording tape along said first path while held in the unstretched and fully recovered condition thereof at a fixed rate past said recording head, a magnetic pickup head mounted adjacent to a second path of travel for said magnetic recording tape and having the output thereof connected to the output terminal of said magnetic transcribing stage, and second drive mechanism for moving said magnetic recording tape along said second path while held in at least a 100% elongated condition at said fixed rate past said pickup head to produce an output signal therefrom; the output terminal of said magnetic card transcriber being connected to the input terminal of the first magnetic transcribing stage and the output terminal of the first and each intermediate transcribing stage being connected to the input terminal of the succeeding magnetic transcribing stage, whereby the time base of the final output signal from the final magnetic transcribing stage is increased by a factor of at least about "$2^n$" as compared to the time base of the signal on said magnetic record card.

18. A system for reducing the time base of a signal and storing the signal on the reduced time base and expanding the time base of the stored signal to the original value thereof, comprising a recording channel including a time base reducing apparatus and a magnetic card recorder, a magnetic record card for recording thereon the signals produced by said recording channel, and a transcribing channel including a magnetic card transcriber for detecting the signal stored on said magnetic record card and a time base increasing apparatus; said time base reducing apparatus including an input terminal and an output terminal, a first magnetic recording tape having an elastomeric body carrying magnetizable material and being capable of at least 100% elongation and having substantially complete recoverability after 100% elongation thereof, a first magnetic recording head mounted adjacent to a first path of travel for said first magnetic recording tape and connected to said input terminal of said time base reducing apparatus, first drive mechanism for moving said first magnetic recording tape along said first path while held in at least a 100% elongated condition at a fixed rate past said first recording head, a first magnetic pickup head mounted adjacent to a second path of travel for said first magnetic recording tape and having the output thereof connected to said output terminal of said time base reducing apparatus, second drive mechanism for moving said first magnetic recording tape along said second path while held in the relaxed and fully recovered condition thereof at said fixed rate past said first pickup head to produce an output signal therefrom, the output of said first pickup head being connected to said output terminal of said time base reducing apparatus; said magnetic card recorder having an input terminal connected to said output terminal of said time base reducing apparatus and being operative to record the signal therefrom on said magnetic record card; said magnetic card transcriber having an output terminal and being operative to detect the signal on said magnetic record card and to reproduce the signal at said output terminal thereof; said time base increasing apparatus including an input terminal connected to said output terminal of said magnetic card transcriber and an output terminal, a second magnetic recording tape having an elastomeric body carrying magnetizable material and being capable of at least 100% elongation and having substantially complete recoverability after 100% elongation thereof, a second magnetic recording head mounted adjacent to a first path of travel for said second magnetic recording tape and connected to the input terminal of said time base increasing apparatus, third drive mechanism for moving said second magnetic recording tape along the first path therefor while held in the unstretched and fully recovered condition thereof at said fixed rate past said second recording head, a second magnetic pickup head mounted adjacent to a second path of travel for said second magnetic recording tape and having the output thereof connected to said output terminal of said time base increasing apparatus, and fourth drive mechanism for moving said second magnetic recording tape along the second path therefor while held in at least a 100% elongated condition at said fixed rate past said second pickup head to produce an output signal therefrom, the output of said second pickup head being connected to said output terminal of said time base increasing apparatus; whereby an input signal to said system has the time base thereof reduced in said recording channel to provide a storage signal on a reduced time base on said magnetic record card which is detected and has the time base thereof expanded in said transcribing channel to recreate at the output terminal of said time base increasing apparatus a signal substantially identical to the input signal to said system.

References Cited by the Examiner

UNITED STATES PATENTS

| | | | |
|---|---|---|---|
| 2,840,639 | 6/58 | Graham ............ | 179—100.2 |
| 2,862,845 | 12/58 | Szegvari ............ | 179—100.2 |
| 2,942,061 | 6/60 | Pfost et al. .......... | 179—100.2 |

OTHER REFERENCES

Bell System Technical Journal, vol. 31, pp. 530–540, May 1952.

IRVING L. SRAGOW, *Primary Examiner.*

BERNARD KONICK, *Examiner.*